United States Patent [19]

Tyler, Jr.

[11] Patent Number: 4,514,870
[45] Date of Patent: May 7, 1985

[54] FIRE RESISTANT LAP PROTECTION BLANKET

[76] Inventor: Charles E. Tyler, Jr., Rte. 1, Box 275, Troy, Va. 22974

[21] Appl. No.: 432,386

[22] Filed: Sep. 30, 1982

[51] Int. Cl.³ .............................................. A47G 9/00
[52] U.S. Cl. .......................................... 5/485; 5/483; 5/482; 2/49 A; 2/69
[58] Field of Search ................... 5/482, 483, 485, 484, 5/502; 2/49 R, 49 A, 69; 296/81; 131/329, 231, 174

[56] References Cited

U.S. PATENT DOCUMENTS

| | | |
|---|---|---|
| 239,193 | 3/1981 | Rescinski . |
| 655,308 | 9/1900 | Robinson . |
| 1,519,741 | 12/1924 | Schickerling .............................. 2/69 |
| 2,114,922 | 4/1938 | Glasmann . |
| 2,388,234 | 11/1945 | Abel . |
| 2,720,269 | 10/1955 | Diacos . |
| 2,954,635 | 10/1960 | Stotter ..................................... 5/502 |
| 2,980,169 | 4/1961 | Campbell .................................. 2/69 |
| 3,001,646 | 9/1961 | Cooper .................................... 2/49 R |
| 3,176,315 | 4/1965 | Freund ..................................... 2/69 |
| 3,329,969 | 7/1967 | Farber et al. ........................... 2/49 R |
| 3,635,785 | 1/1972 | Hughes ..................................... 5/502 |
| 3,828,856 | 9/1974 | Wallis . |
| 3,900,154 | 8/1975 | Martin .................................... 2/49 R |
| 4,038,447 | 7/1977 | Brock . |
| 4,261,057 | 4/1981 | Andersson ............................. 2/49 R |

Primary Examiner—Alexander Grosz
Assistant Examiner—Michael F. Trettel
Attorney, Agent, or Firm—Lowe King Price & Becker

[57] ABSTRACT

A fire resistant lap protection blanket (20) to be placed across the lap of the driver or passenger of a vehicle to protect clothing from tobacco burns or soiling includes a fire resistant material dimensioned to substantially cover the lap to interrupt debris dropping thereon. A lower pocket (25) is open upwardly below the knees to receive and contain debris collecting on the fire resistant material. A foam backing layer (30) disposed upon the bottom surface of the fabric isolates the lap of the user from hot debris. First and second fastening strips (40, 42) respectively attached to an upper corner of the fabric or foam layer and an arm rest (44) anchor the blanket to the arm rest to prevent unintentional removal of the blanket from the vehicle. The strips (40, 42) are preferably of a quick release type so that the blanket can be removed from the vehicle. The fabric is preferably light weight and moldable to form a shallow depression (22) extending longitudinally between the user's thighs in the direction of the pocket to facilitate collection of debris on the fabric for transfer to the pocket (25).

8 Claims, 6 Drawing Figures

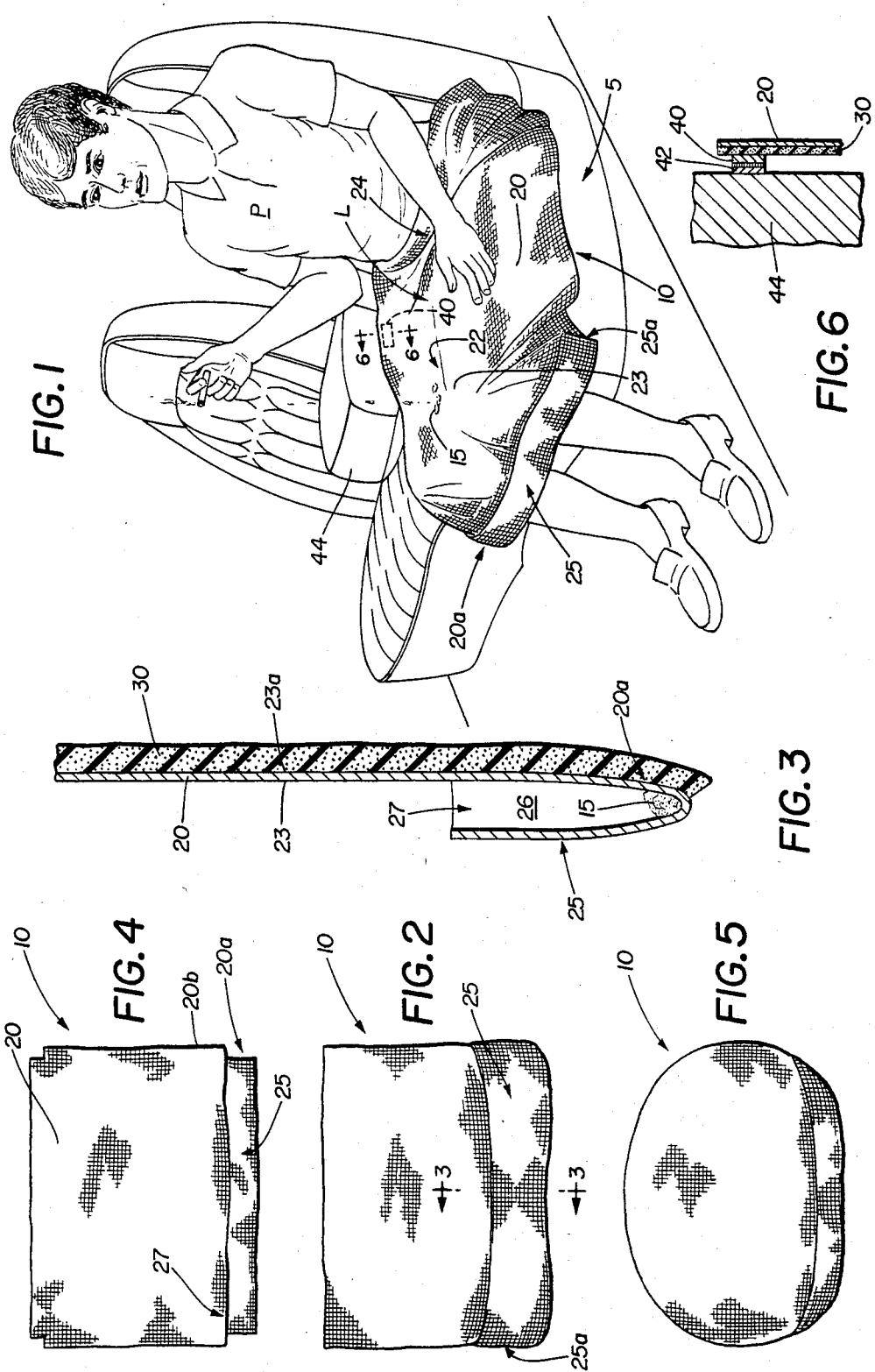

FIRE RESISTANT LAP PROTECTION BLANKET

TECHNICAL FIELD

This invention relates generally to fire resistant blankets and, more particularly, to a fire resistant blanket positionable upon a seated user's lap to catch and retain debris dropping thereon.

BACKGROUND ART

Individuals who smoke or eat while driving or sitting within vehicles often have debris such as food or lighted tobacco products, drop onto their clothing or vehicle seat. Such debris usually fall upon the seated person's lap, soiling their garments; burning tobacco from cigarettes, cigars or pipes in addition to ruining clothing or a vehicle seat cover, may injure the user.

Drivers who smoke or eat while driving tend to jeopardize safe vehicle operation since part of their concentration that would otherwise be completely devoted to assure safe driving is focussed upon the food or tobacco being consumed. If burning tobacco or hot food or liquid fall upon the driver's lap, the driver must immediately direct his attention to the problem and temporarily disregard surrounding traffic and driving conditions, often with tragic consequences.

It is accordingly an object of the present invention to provide a fire resistant lap protection blanket for covering the lap of a seated driver or passenger to prevent burning or soiling of garments or of the vehicle seat by falling food or lighted tobacco products.

Another object of the invention is to provide a protection blanket that protects the user from burns caused by lighted tobacco and prevents heat from being transmitted to the user's body.

Still another object is to provide a protection blanket that can safely retain debris dropping thereon to prevent the debris from damaging the user's garments or vehicle interior.

A further object is to provide a blanket that can be rolled or folded for easy and compact storage within the vehicle cabin.

Yet another object is to provide a blanket that can be anchored to the vehicle adjacent the user to prevent its loss and retain the blanket in position across the user's lap.

Still another object is to provide a blanket that is light weight for comfort and decorative.

A further object is to provide a blanket that is retained within a vehicle during use, yet easily removed for cleaning.

DISCLOSURE OF INVENTION

A fire resistant lap protection blanket according to the present invention comprises a piece of fire resistant material dimensioned to substantially cover the lip and clothing of a driver or passenger to catch debris falling thereon. The material preferably includes a lower pocket formed along an edge thereof, open upwardly to retain debris falling onto the material. Settling of debris into the pocket is user assisted by gently shaking the material or brushing the debris into the pocket for subsequent disposal. The material and pocket are formed from a fabric treated with a fire and moisture resistant silicon composition.

A layer of backing material disposed adjacent the fire retardant material to directly engage the user's lap has a high coefficient of friction to prevent the blanket from sliding off the lap. Preferably, the backing layer is a sheet of heat insulating foam material to prevent heat from being transmitted to the user's skin.

Attachment means, preferably including first and second strips of releasably engageable fastening material respectively attached to a corner of the fire retardant material and an arm rest or storage compartment adjacent the user, prevent loss of the blanket and maintain the blanket across the user's lap.

Still other objects and advantages of the present invention will become readily apparent to those skilled in this art from the following detailed description, wherein I have shown and described only the preferred embodiments of the invention simply by way of illustration of the best mode contemplated by me of carrying out my invention. As will be realized, the invention is capable of modifications in various respects, all without departing from the invention. Accordingly, the drawings and description are to be regarded as illustrative in nature, and not as restrictive.

BRIEF DESCRIPTION OF DRAWING

FIG. 1 is a perspective view of a fire resistant lap protection blanket in accordance with the present invention, covering the lap of a seated individual;

FIG. 2 is a front view of the blanket;

FIG. 3 is a cross sectional view taken through the line 3—3 of FIG. 2;

FIG. 4 and 5 are front views similar to FIG. 2 showing alternative shapes of the blanket; and FIG. 6 is a view taken through the line 6—6 of FIG. 1 showing a means for securing the blanket within a vehicle.

BEST MODE FOR CARRYING OUT THE INVENTION

Referring to FIG. 1, fire resistant lap protection blanket 10 of the invention is adapted to cover the lap of a driver or passenger seated upon a vehicle seat S. Blanket 10 protects portions of a garment (e.g., pants, skirt, dress) covering the lap, from being soiled or burned by debris 15 (e.g. lighted tobacco, cigarette ash, food crumbs and liquids) dropping onto the lap from hand-held tobacco or food products typically held above the lap. As used herein, the term "lap" refers to the front or upwardly facing part of the thighs and lower trunk of a seated driver or passenger likely to be within the path of falling debris 15.

Blanket 10 comprises a rectangular piece of heat resistant fabric material 20 dimensioned to substantially cover the lap, as shown in FIGS. 1 and 2. To maximize user comfort, fabric 20 is preferably formed from a light weight and thin, single or multi-ply material that can be easily laundered and which will present a pleasing appearance. Fabric 20 is preferably flexible enough to be centered on the user's thighs and lower trunk, establishing a shallow depression 22 extending between the thighs and knees of the user. An upper surface portion 24 of the blanket covers the lower trunk and is inclined downwardly toward the depression. Formation of depression 22 and surface portion 24 with fabric 20, though not essential, are highly desirable to the invention, since they cooperate to cause debris 15 falling onto the upper surface 23 of fabric 20 to collect in the depression for easy transfer into a lower pocket 25, discussed infra.

Preferred materials forming fabric 20 include canvas, velour, denim and corduroy. A blanket made of any of these materials can be made attractive (e.g., color coordinated and textured to match the vehicle interior), are light weight and flexible to maximize user comfort, yet stiff enough to retain their shape defining depression 22 and inclined surface 24 when positioned on the lap.

While blanket 10 may be any suitable fire resistant material such as asbestos, glass fiber or leather dimensioned to cover the lap, it is preferred to use lighter materials, as discussed supra which are impregnated with fire resistant chemicals as well known in the art, such as commercially available silicon based compositions. Silicon compositions advantageously also provide fabric 20 with moisture resistant characteristics, preventing transit of spilled hot liquids into the user's garments underlying blanket 10. As used herein, the term "fire resistant" material means that the material is so resistant to fire and heat that for a specified time (e.g., 10-15 minutes) it will not fail structurally, preventing debris 15 from burning through or melting the material. Preferably, the term fire resistant means that burning or hot debris, such as cigarette ash, hot liquid, etc. will burn itself out, losing its heat, without damaging blanket 10.

As best shown in FIGS. 1 and 3, lower pocket 25 is formed along lower edge 20a of fabric 20 and preferably extends transversely the full width of the fabric to catch and retain debris 15 falling onto exposed fabric surface 23. Pocket 25 is preferably formed by folding back lower edge 20a. Lateral edges 25a are secured to overlapping lateral edges of the fabric with through stitching or appropriate bonding adhesives, completing pocket 25. With this arrangement, a pocket opening 27 extends the full transverse width of fabric 20, open in the direction of upper fabric surface 23. Rectangular pocket 25 is preferably disposed substantially vertically below the seated user's knees so that debris 15 can be transferred and safely contained within the pocket by gently shaking fabric 20 or brushing the debris into the pocket. Providing pocket 25 within blanket 10 in the above position assures that debris 15 dropping onto lap L (i.e., fabric 20) can be brushed or shaken into the pocket when desired by the user for safe containment until disposed of, with minimal distraction. With the above arrangement, the pocket is also fire resistant.

In the embodiment of blanket 10 illustrated in FIG. 4, lateral edges 25a are spaced inwardly from corresponding lateral edges 20b of fabric 20 to define a pocket opening 27' which does not extend the full width of the fabric. This feature is desirable to assure that pocket 25 is suspended freely below the user's knees by preventing the lateral portions of the pocket from wrapping around the vehicle seat which may tend to partially close pocket opening 27. In this manner, opening 27' remains fully open to receive debris 15. The embodiment of FIG. 5 accomplishes the same result.

A backing layer 30 can be provided on lower surface 23a of fabric 20 to isolate the user's lap from any hot debris 15 on the fabric. Backing material 30, either bonded or sewn to fabric 20 to cover lower surface 23a, is preferably formed from flexible foam materials to provide a heat insulating air space between fabric 20 and garments covering lap L. Backing 30 serves the further function of cushioning the impact of objects (e.g., a pipe, sunglasses) dropping onto lap L. Backing material 30 can also provide a high coefficient of friction between blanket 10 and garments covering lap L to prevent displacement of the blanket from the user's lap.

Blanket 10 is preferably attachable to vehicle structure located adjacent vehicle seat S with a pair of releasably attachable first and second fastening strips 40, 42 respectively carrying resiliently deformable hook and loop like projections 40a, 42a, such as the type sold under the trademark "VELCRO". As shown in FIGS. 1 and 6, strips 40, 42 are respectively secured to an arm rest 44 and an upper corner of fabric 20 or backing material 30 on the bottom surface thereof adjacent the arm rest to maintain the blanket relatively stationary with respect to the arm rest structure. This feature performs a variety of useful functions. For example, strips 40, 42 prevent blanket 10 from being inadvertently removed from the vehicle as the user exits from the vehicle cabin, forgetting to remove the blanket from their lap. By securing an upper corner of blanket 10 (i.e., located remote from the vehicle door) to arm rest 44, the blanket slides easily off the lap without spilling debris 15 from pocket 25. Additionally, fastening strips 40, 42 help prevent blanket 20 from being blown off the lap as might occur when the vehicle window is open. Since strips 40, 42 are "quick release" fasteners, blanket 10 can be easily removed from the vehicle when necessary to dispose of any debris 15 contained within pocket 25 or to wash the blanket.

When not in use, blanket 10 can be easily rolled or folded into a compact shape for storage within a vehicle storage compartment (not shown). After the user has been seated, blanket 10 is removed from storage and unfolded to be placed upon lap L. By properly positioning blanket 10 upon the lap, discussed supra, the surface 24 covering the user's lower trunk extends downwardly into depression 22 leading into pocket cavity 26 via lower pocket opening 27. Thus, when debris 15 drops onto fabric 20, the debris tends to collect within depression 22 for easy transfer and safe containment within pocket 25, protecting the user's garment from possible damage.

In this disclosure, there is shown and described only the preferred embodiments of the invention, but as aforementioned, it is to be understood that the invention is capable of changes or modifications within the scope of the inventive concept as expressed herein.

I claim:

1. A fire-resistant blanket adapted for placement in a vehicle upon a seated user's lap to protect clothing from tobacco burns and the like, comprising:
    (a) a piece of fire resistant material dimensioned to substantially cover the seated person's lap and clothing to catch debris dropping thereon;
    (b) a pocket formed along an edge of the material for receiving and retaining debris collecting on the material, said pocket being operatively attached to the material so that debris can fall into the pocket by gently shaking the material or brushing the debris in the direction of the pocket for containment thereon; and
    (c) a layer of heat insulating backing material attached to cover a lower surface of said fire resistant material so as to directly contact and cover the user's lap, said backing material having a high coefficient of friction to prevent slippage of the blanket from the user's lap, said backing layer being a sheet of foam material.

2. The blanket of claim 1, wherein said pocket is formed substantially along an entire lower edge of the material.

3. The blanket of claim 2, wherein said pocket is formed integrally with the material.

4. The blanket of claim 3, said material being further dimensioned to locate the pocket substantially vertically below the knees of the user, said pocket facing upwardly to catch and retain debris falling therein from a lap covering portion of the material.

5. The blanket of claim 4, wherein said material and pocket are formed from a fabric treated with a fire and moisture resistant silicon composition.

6. The blanket of claim 1 or 5, further including means for attaching the material to a portion of the vehicle immediately adjacent the user.

7. The blanket of claim 6, wherein said attachment means includes a releaseably attachable first fastening strip secured to a corner of the material, said strip including a plurality of resiliently deformable hooked projections, and a second strip of resiliently deformable loop projections attachable to said arm rest or the like for mating engagement with the first strip.

8. The blanket of claim 2, wherein said pocket has lateral edges being spaced inward from corresponding lateral edges of said material so that the pocket opening does not extend the full width of the fire resistant material located between the lateral edges of said material, thereby allowing the pocket to be suspended freely below the user's knees by preventing lateral portions of the pocket from wrapping around the vehicle seat which tends to partially close the pocket opening.

* * * * *